US011962494B2

(12) United States Patent
Ramaswamy et al.

(10) Patent No.: US 11,962,494 B2
(45) Date of Patent: Apr. 16, 2024

(54) METHODS AND SYSTEMS FOR DATA CONSISTENT SEARCH AND STORAGE USING TREES

(71) Applicant: Pensando Systems Inc., Milpitas, CA (US)

(72) Inventors: Pavithra Ramaswamy, Fremont, CA (US); Sarat Kamisetty, Fremont, CA (US); Lakshmi Narasimhan Seshan, San Jose, CA (US); Sri Goli, Dublin, CA (US)

(73) Assignee: Pensando Systems Inc., Milpitas, CA (US)

( * ) Notice: Subject to any disclaimer, the term of this patent is extended or adjusted under 35 U.S.C. 154(b) by 224 days.

(21) Appl. No.: 17/381,170

(22) Filed: Jul. 20, 2021

(65) Prior Publication Data
US 2023/0023674 A1    Jan. 26, 2023

(51) Int. Cl.
*H04L 45/48*    (2022.01)
(52) U.S. Cl.
CPC .................................... *H04L 45/48* (2013.01)
(58) Field of Classification Search
CPC ........................................................ H04L 45/48
USPC ......................................................... 707/791
See application file for complete search history.

(56) References Cited

U.S. PATENT DOCUMENTS

| 7,937,355 | B2 | 5/2011 | Corl, Jr. et al. |
| 8,879,550 | B2 | 11/2014 | Anand et al. |
| 9,921,769 | B2 * | 3/2018 | Aron .................... G06F 11/1448 |
| 10,148,571 | B2 | 12/2018 | Kfir et al. |
| 10,630,674 | B2 | 4/2020 | Bell et al. |
| 10,659,361 | B2 | 5/2020 | Zhao et al. |
| 2018/0287935 | A1 * | 10/2018 | Wang .................. H04L 12/4625 |
| 2019/0318022 | A1 | 10/2019 | Haber et al. |
| 2020/0150897 | A1 * | 5/2020 | Guturi ..................... G06F 3/067 |
| 2021/0117399 | A1 * | 4/2021 | Dalgliesh ................ G06F 16/25 |
| 2022/0414067 | A1 * | 12/2022 | Dai ..................... G06F 16/9024 |

OTHER PUBLICATIONS

Firestone, Daniel, "VFP: A Virtual Switch Platform for Host SDN in the Public Cloud", Microsoft, (2017), 14 pgs.
Wikipedia, "Interval tree", https://en.wikipedia.org/wiki/Interval_tree, downloaded Mar. 5, 2021, 9 pgs.

* cited by examiner

*Primary Examiner* — Cam Linh T Nguyen
(74) *Attorney, Agent, or Firm* — LOZA & LOZA, LLP

(57) ABSTRACT

Two versions of a database can be held in two trees that have many of the same nodes. Both trees can be concurrently searched using recursive algorithms. A root node indicator indicates a root node for a tree search algorithm. The root node indicator can indicate a first root node of a first tree. A tree search algorithm can identify a record node in the first tree. Intermediate nodes between the record node and the first root node can be identified and retained nodes can be identified. A second root node and replacement intermediate nodes can be instantiated. A second tree that includes the second root node, the replacement intermediate node, and the retained nodes can be created. The root node indicator can be set to indicate the second root node after creating the second tree.

20 Claims, 12 Drawing Sheets

METHODS AND SYSTEMS FOR DATA CONSISTENT SEARCH AND STORAGE USING TREES

TECHNICAL FIELD

The embodiments relate to computer networks, network interface cards, network appliances, routers, switches, load balancers, data structures, data structures storing networking data, tree data structures, and to thread safe modification of networking data in tree data structures by network appliances operating at line speed.

BACKGROUND

Trees are notoriously well known and commonly used data structures that can include numerous nodes including a root node, leaf nodes. Many commonly used database applications use trees for searching or storing database records. The records can be stored in the nodes or in association with the nodes. For example, a node can include a record, an indicator that indicates the storage location of a record, an indicator indicating a location and access method for a record, etc. The nodes can be arranged, or ordered, within the tree based on a key that may be derived from one or more data fields of the records. Those practiced in computer programming are familiar with a variety of tree data structures and the algorithms that can be used for searching trees, recursively searching trees, adding nodes, deleting nodes, rebalancing trees, modifying records, and modifying nodes. Network appliances can use trees for storing and searching databases of networking data.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a method. The method can include storing a root node indicator that indicates a root node for a tree search algorithm, setting the root node indicator to indicate a first root node of a first tree, using the tree search algorithm to identify a record node in the first tree, identifying an intermediate node between the record node and the first root node, identifying a plurality of retained nodes, instantiating a second root node and a replacement intermediate node, creating a second tree that includes the second root node, the replacement intermediate node, and the retained nodes, and setting the root node indicator to indicate the second root node after creating the second tree.

Another aspect of the subject matter described in this disclosure can be implemented by a network appliance. The network appliance can be configured to store a root node indicator that indicates a root node for a tree search algorithm, set the root node indicator to indicate a first root node of a first tree, use the tree search algorithm to identify a record node in the first tree, identify an intermediate node between the record node and the first root node, identify a plurality of retained nodes, instantiate a second root node and a replacement intermediate node, create a second tree that includes the second root node, the replacement intermediate node, and the retained nodes, and set the root node indicator to indicate the second root node after creating the second tree.

Yet another aspect of the subject matter described in this disclosure can be implemented by a system. The system can include a means for storing a plurality of records, a means for receiving a new data for storage in the records, a means for using the new data to identify a plurality of altered tree nodes and retained tree nodes, a means for producing a second tree from a first tree by replacing the altered tree nodes and retaining the retained tree nodes, and a means for a non-blocking search of the records.

In some implementations of the methods and devices, the method includes using the root node indicator to initiate a first search at the first root node before setting the root node indicator to indicate the second root node, and using the root node indicator to initiate a second search at the second root node after setting the root node indicator to indicate the second root node, wherein the second search begins before the first search completes. In some implementations of the methods and devices, the first root node is deleted when a thread count indicates there are no active searches rooted at the first root node. In some implementations of the methods and devices, the record node associates an indexed field interval with a record, a second record node is instantiated that associates the indexed field interval with a second record, the second tree includes the second record node, and the second tree does not include the record node.

In some implementations of the methods and devices, the record node associates an indexed field interval with a record that includes a plurality of rule category indicators, one of the rule category indicators indicates a valid result for a first rule category, and another one of the rule category indicators indicates that there is no valid result for a second rule category. In some implementations of the methods and devices, the first rule category includes routing rules. In some implementations of the methods and devices, the root node indicator is used by a rule search that is performed in response to receiving a network packet, and the rule search determines that the record matches the network packet. In some implementations of the methods and devices, the first tree and the second tree are interval trees. In some implementations of the methods and devices, the tree search algorithm is a pure interval search algorithm.

In some implementations of the methods and devices, a rule search includes a first index search and a second index search, the root node indicator is associated with a first indexed field, a second per-field root node indicator is associated with a second indexed field and indicates a second per-field root node of a second per-field tree, the first index search uses the root node indicator and yields no valid result for a first rule category, the second index search uses the second per-field root node indicator to search the second per-field tree and yields a valid result for the first rule category, and the rule search returns the valid result. In some implementations of the methods and devices, the first index search yields a second valid result for a second rule category, the second index search yields no valid result for the second rule category, and the rule search returns the second valid result.

In some implementations of the methods and devices, the network appliance performs a first rule search in response to receiving a first network packet, the network appliance performs a second rule search in response to receiving a second network packet, the first rule search uses the root node indicator to search the first tree, the second rule search uses the root node indicator to search the second tree, and the first rule search and the second rule search run concurrently. In some implementations of the methods and devices, the first rule search determines that the record node matches the first network packet, the record node associates an indexed field interval with a record that includes a plurality of rule category indicators, one of the rule category indicators indicates a valid result that is for a first rule category, and another one of the rule category indicators indicates no valid result for a second rule category. In some implementations of the methods and devices, the first rule category includes firewall rules. In some implementations of the methods and devices, the tree search algorithm is a pure interval search algorithm.

In some implementations of the methods and devices, the first rule search includes a first index search and a second index search, the root node indicator is associated with a first indexed field, a second per-field root node indicator is associated with a second indexed field, the first index search uses the root node indicator to search the first tree, the second index search uses the second per-field root node indicator to search a second per-field tree, the first index search yields no valid result for the second rule category, the second index search yields a second valid result that is for the second rule category, and the first rule search returns the valid result and the second valid result. In some implementations of the methods and devices, the second index search yields a third valid result that is for the first rule category, and the first rule search does not return the third valid result. In some implementations of the methods and devices, the means for the non-blocking search is a pure interval search means.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
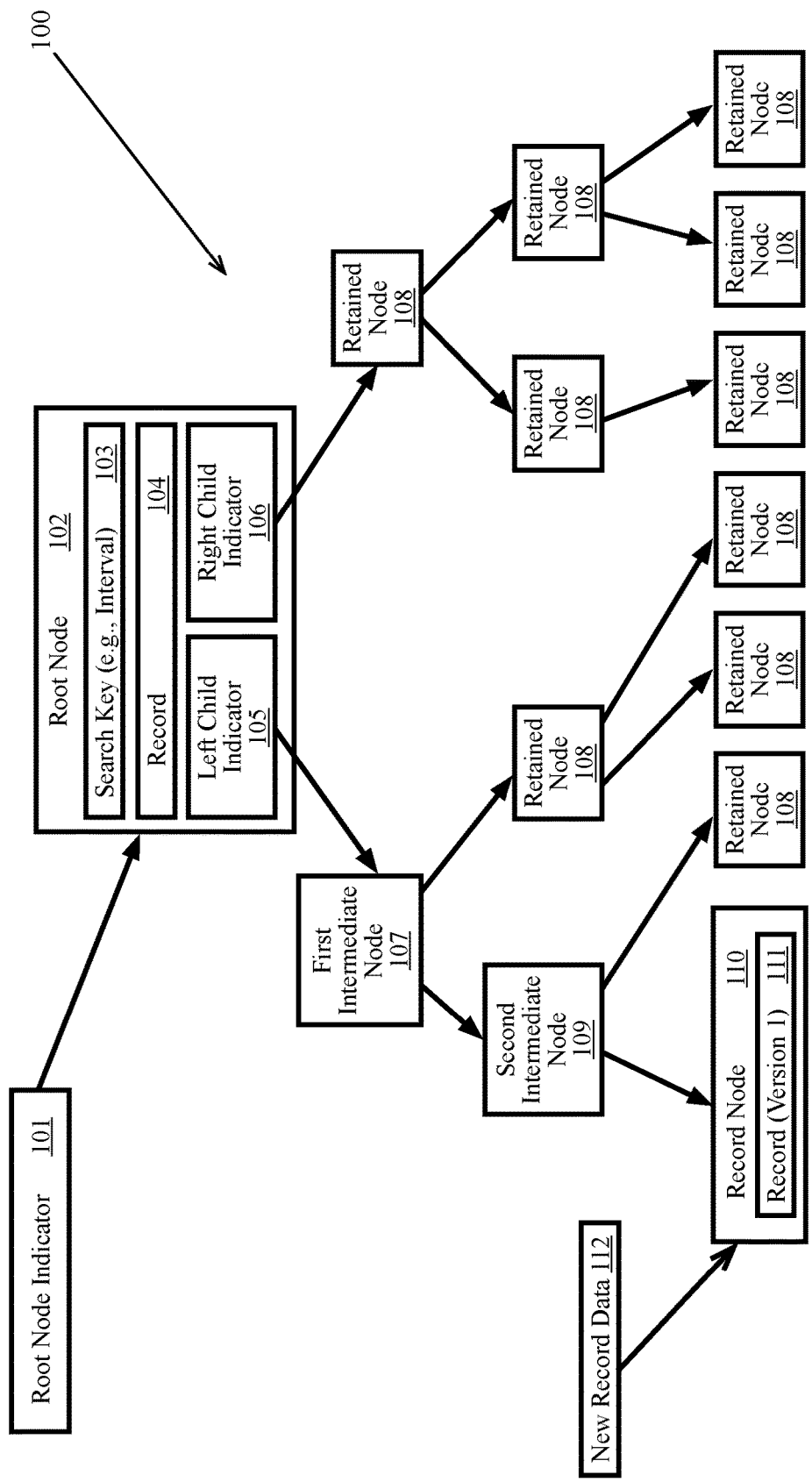
FIG. 1 is a high-level block diagram illustrating new record data for storage in a database according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Network appliances can store networking data as records in trees such as binary trees such that networking data for a packet can be located using a tree search algorithm. Examples of networking data include routing rules, session data, network flow data, firewall rules, and other networking data. Delays in finding the networking data for a packet reduce the performance and throughput of network appliances. One source of such delays can be locking a database while one or more records are added, deleted, or modified. Locking a database during modification may ensure that search threads, which search but do not modify, always return data that is valid. This is known as consistency. One way that consistency can be maintained is to copy the entire database, modify the copy, and swap in the modified version for future searches. Such an approach is wasteful. A more efficient approach is possible due to the recursive nature of tree search algorithms. Two different versions of a tree can coexist have different root nodes, different intermediate nodes, and many of the same nodes. Here, "same node(s)" means the same data at the same location in memory and not the same data stored at different locations in memory. As such, a current version of the tree can be searched while a future version of the tree that uses many of the same nodes is instantiated. Search threads can search the current version without delay because the current version is not locked. After it is ready, the future version can be used by the search threads. As such, the search threads never encounter an inconsistent database and are never delayed due to a locked database.

Further improvements in search speed and code complexity can be obtained by using pure interval searches. Nodes can have search keys that are specific values (e.g., specific integer value, specific text string, etc.), or that are intervals. Note that an interval search key that covers one specific value (e.g., less than or equal to five AND greater than or equal to five) is operationally identical to a search key for a specific value. As such, search keys for specific values can be reformulated as search keys for intervals, also called interval search keys. A pure interval tree is a tree in which every node's search key is an interval search key. A pure interval search is a search of a pure interval tree. Relative to other implementations, implementations that only use pure interval searches can have reduced code complexity, can have reduced code size, and may have increased code execution speed. It is well known in the programming arts that the number of software bugs tends to be proportional to the code size. As such, using pure interval searches may lead to more reliable and bug free code.

Yet further improvements include using multiple per-field trees and numerous rule categories per record. Different per-field trees can use different indexed fields. For example, a first per-field tree can be indexed on source IP addresses and can be used to search based on a packet's source IP address while a second per-field tree can be indexed on destination ports and can be used to search based on a packet's destination port. Two searches can concurrently search the first and the second per-field tree. The search result can be selected from the records located in the different trees. Rule categories refer to the types of the rules. Routing rules can be one rule category, firewall rules can be another rule category, etc. A node's record can store values for numerous rule categories. As such, a search can return results for numerous rule categories and thereby reduce the need for multiple searches. For example, a single search can locate the load balancing rule, the routing rule, and the firewall rule for a network packet. The rules found for a packet can be associated with that packet such that later searches can be avoided.

The principal advantage is increased packet throughput. More packets can be processed per unit time because the search threads aren't delayed, and later searches are avoided. Another advantage is a reduction in code complexity which can lead to faster execution and less opportunity for coding errors.

Figure 2:
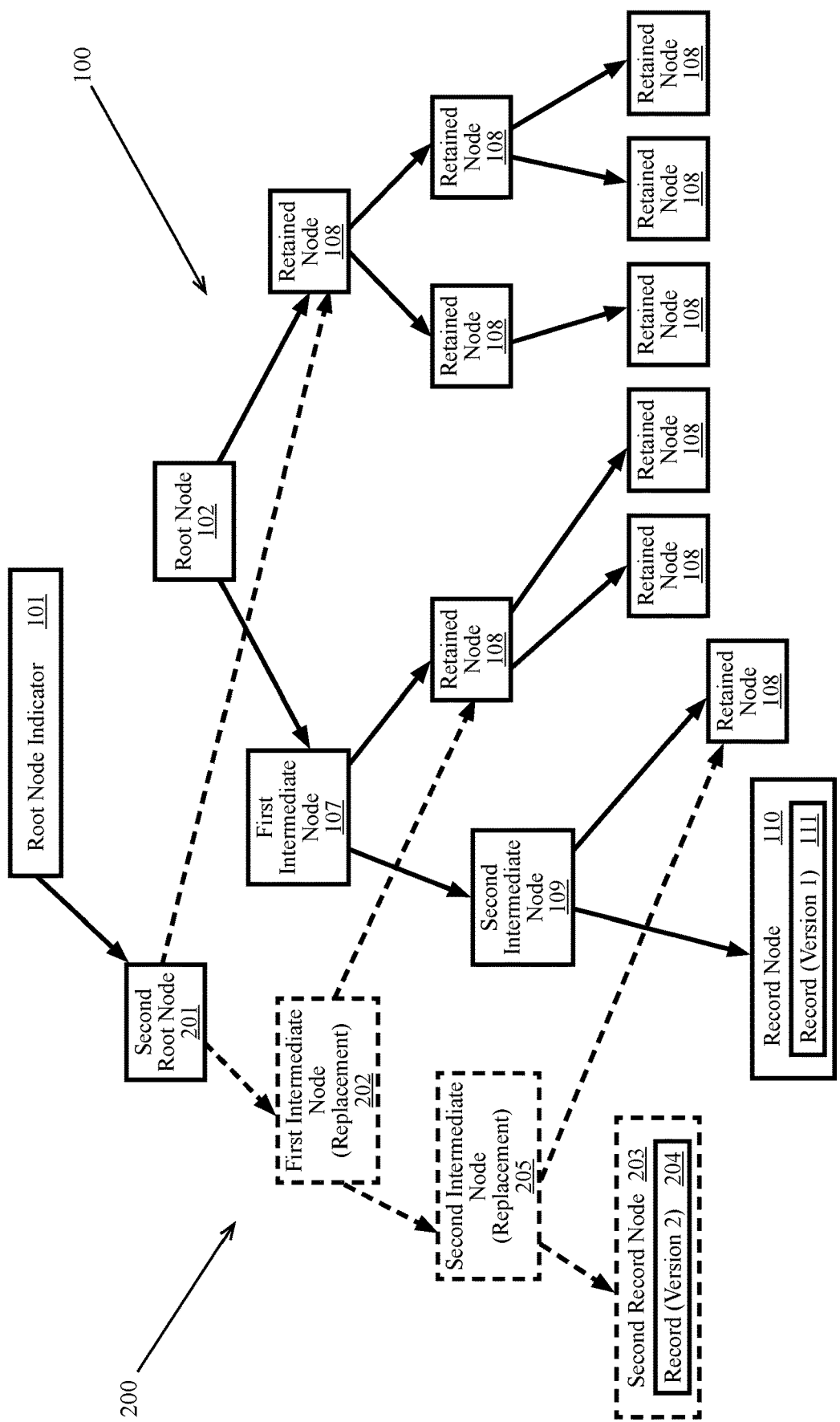
FIG. 2 is a high-level block diagram illustrating a first tree and a second tree storing different versions of a record according to some aspects.
Figure 3:
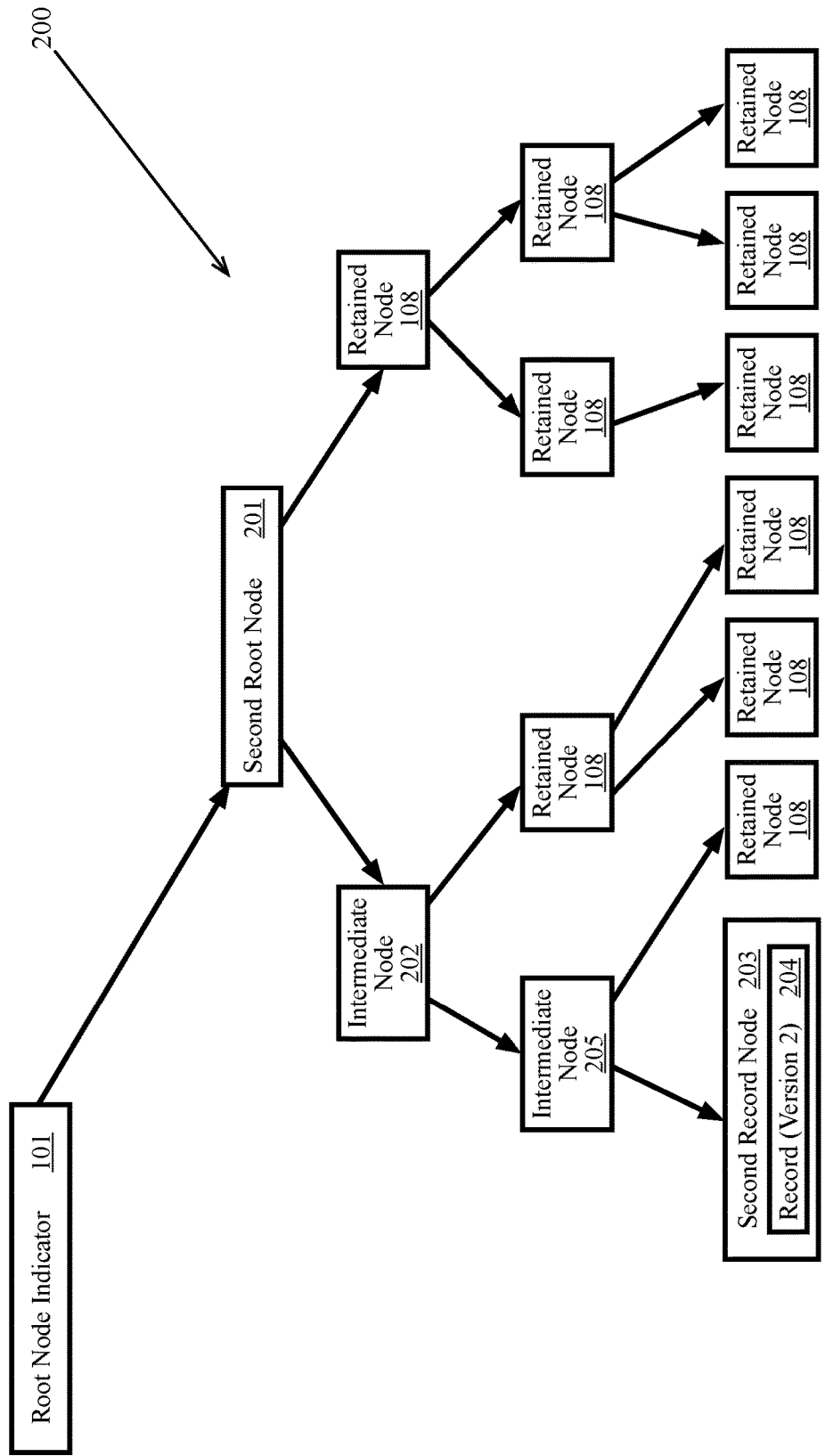
FIG. 3 is a high-level block diagram illustrating the second tree according to some aspects.

FIGS. 1-3 illustrate the formation of a second tree that is a new version of a first tree. Search threads can search the first tree before, during, and after the formation of the second tree. However, new search threads can be directed to the second version after it is formed such that new search threads locate the newest versions of the data records. As such, there are eventually no threads searching the first tree. At that time, some nodes of the first tree can be garbage collected or freed.

FIG. 1 is a high-level block diagram illustrating new record data 112 for storage in a database according to some aspects. The data in the database can be stored in or accessed via a tree such as the first tree 100. A root node indicator 101 points to the root node 102 of the first tree 100. A recursive search algorithm that searches trees such as the first tree 100 can begin with the root node, which is indicated by the root node indicator, and recursively search the tree until a matching node is found or until the entire tree has been searched and no matching node has been found. The nodes of the tree can include a search key 103, record data 104, a left child indicator 105, and a right child indicator 106. The search key can include a value, values, or a range of values that can be compared to a value being searched for. If the comparison indicates that the search matches a searched for value, then the node is a matching node for the search. The record 104 can include data such as a database record or can include indicators that indicate locations of data such as a database record. The left child indicator 105 and the right child indicator 106 can indicate the locations of child nodes. Recursive search algorithms can process a node such as the root node 102, may then proceed to recursively process the left child node and its child nodes, and then may proceed to recursively process the right child node and its child nodes.

The search keys 103 of the nodes of the first tree 100 can be used for searching for the location at which to store the new record data 112. That location is determined to be a record node 110. The record node 110 currently stores record data version 1 111. Intermediate nodes such as the first intermediate node 107 and the second intermediate node 109 are the nodes that must be traversed to go from the root node 102 to the record node 110. The other nodes in the first tree are retained nodes 108. The first tree can be searched to find data in the database. Search threads can read the root node indicator 101 to determine the location of the root node 102. The tree can then be recursively searched beginning at the root node 102. Those practiced in computer programming are familiar with recursive tree search algorithms.

FIG. 2 is a high-level block diagram illustrating a first tree 100 and a second tree 200 storing different versions of a record according to some aspects. A second record node 203 can be instantiated to hold record data version 2 204. Record data version 2 204 can include the new record data 112.

Replacement intermediate nodes such as the first intermediate node replacement 202 and the second intermediate node replacement 205 can be instantiated by copying the intermediate nodes and then modifying them. For example, the first intermediate node 107 can be copied to instantiate the first intermediate node replacement 202 and the second intermediate node 109 can be copied to instantiate the second intermediate node replacement 205. At first, the second intermediate node replacement 205 identifies a retained node 108 as its right child node and record node 110 as its left child node. The second intermediate node replacement 205 can be modified to have the second record node 203 as its left child node. At first, the first intermediate node replacement 202 identifies a retained node 108 as its right child node and the second intermediate node 109 as its left child node. The first intermediate node replacement 202 can be modified to have the second intermediate node replacement 205 as its left child node. A second root node 201 can be the root node of the second tree 200. The second root node 201 can be instantiated by copying the first root node 102 then modifying it. For example, the second root node 201 can be modified to have the first intermediate node replacement 202 as its left child.

The first tree 100 and the second tree 200 can coexist and each can be concurrently searched using recursive tree search algorithms. The first tree has a version of the database and search threads can use the first tree to search that version of the database. The second tree 200, however, has a more recent version of the database. As such, the root node indicator can be set to point to the second root node 201 so that all new searches use the second tree 200 to search the more recent version of the database. The searches are non-blocking searches because the first tree is not locked when new data is stored in the database and because the process for storing new data in the database can run without waiting for searches using the first tree to complete.

FIG. 3 is a high-level block diagram illustrating the second tree 200 according to some aspects. Many computer languages and run environments include garbage collectors that can detect when a block of memory is no longer used. Some computing environments require individual computer programs to incorporate garbage collectors. One way of determining that a memory block can be recovered is to keep a reference count. A root node's reference count can be increased by one when the root node indicator references the root node and each time a search thread begins a search at the root node. The reference count can be decreased by one when search threads complete and when the root node indicator is changed to indicate a different node. The reference counts of the root node 102, the record node 110, and the intermediate nodes (e.g., the first intermediate node 107 and the second intermediate node 109) can drop to zero after the root node indicator 101 is set to indicate the second root node 201 and after completion of the search threads using the first tree. As such, the root node 102, the record node 110, and the intermediate nodes can be deleted and their memory freed. The result of deleting the first tree 100 is that only the second tree 200 remains. For consistency and clarity, FIG. 3 keeps the previous labeling of the nodes as "intermediate", "retained", "second", etc. In practice, the second tree 200 is simply a tree having a root node and other nodes.

Figure 4:
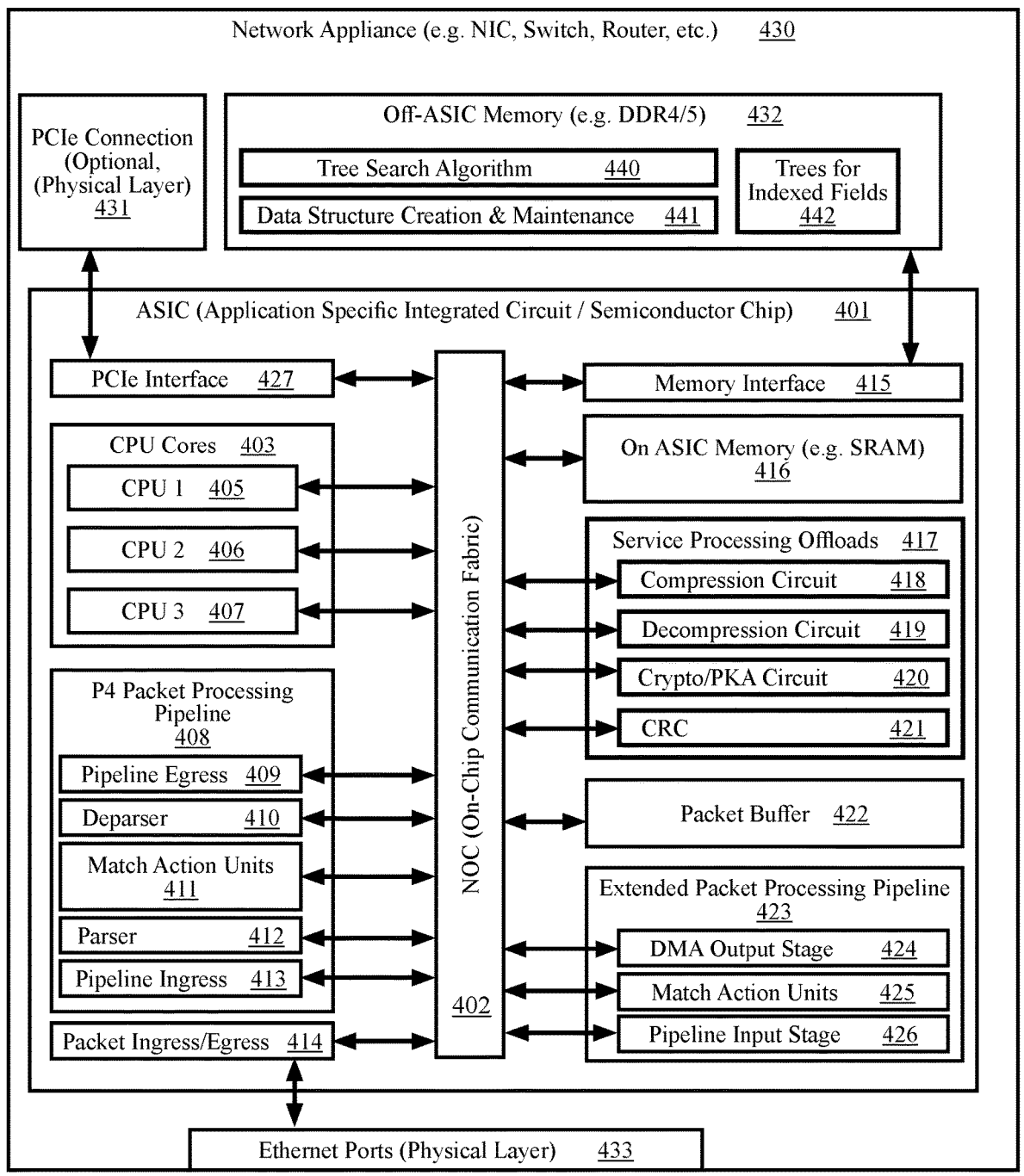
FIG. 4 is a functional block diagram of a network appliance such as a network interface card (NIC) or a network switch having an application specific integrated circuit (ASIC), according to some aspects.

FIG. 4 is a functional block diagram of a network appliance 430 such as a network interface card (NIC) or a network switch having an application specific integrated circuit (ASIC) 401, according to some aspects. A network appliance that is a NIC includes a peripheral component interconnect express (PCIe) connection 431 and can be installed in a host computer. A NIC can provide network services to the host computer and to virtual machines (VMs) running on the host computer. The network appliance 430 includes an off-ASIC memory 432, and ethernet ports 433. The off-ASIC memory 432 can be one of the widely available memory modules or chips such as DDR4 SDRAM modules such that the ASIC has access to many gigabytes of memory. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used advanced extensible interface (AXI) bus. The ASIC's core circuits can include a PCIe interface 427, central processing unit (CPU) cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. A PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPU cores. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniB and channel adapter, of an NVMe card, and of a network appliance that processes network traffic flows carried by IP (internet protocol) packets.

The P4 packet processing pipeline 408 is a specialized set of elements for processing network packets such as IP packets, NVMe protocol data units (PDUs), and InfiniBand PDUs. The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is defined in the "P4$_{16}$ Language Specification," version 1.2.2, as published by the P4 Language Consortium on May 17, 2021. P4 (also referred to herein as the "P4 specification," the "P4 language," and the "P4 program") is designed to be implementable on a large variety of targets including network switches, network routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system. The memory 432 can also be used to store tree search algorithms 440, data structure creation and maintenance code 441, and trees for indexed fields. The tree search algorithms can be recursive tree search algorithms such as pure interval search algorithms that can be used to search interval trees. The data structure creation and maintenance code 441 can be used for instantiating tree nodes, instantiating trees, modifying nodes and trees, and deleting nodes and trees. The trees for indexed fields can include numerous per-field trees for different indexed fields. The trees can be pure interval trees whose nodes have interval search keys.

The CPU cores 403 can be general purpose processor cores, such as reduced instruction set computing (RISC) processor cores, advanced RISC machine (ARM) processor cores, microprocessor without interlocked pipelined stages (MIPS) processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniB and channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be specialized circuits or parts of a specialized circuit implementing programmable packet processing pipelines. Some embodiments include a P4 pipeline as a fast data path within the network appliance. The fast data path is called the fast data path because it processes packets faster than a slow data path that can also be implemented within the network appliance. An example of a slow data path can be a software implemented data path wherein the CPU cores 403 and memory 432 are configured via software to implement a slow data path.

The ASIC 401 is illustrated with a P4 packet processing pipeline 408 and an extended packet processing pipeline 423. The extended packet processing pipeline is a packet processing pipeline that has a direct memory access (DMA) output stage 424. The extended packet processing pipeline has match-action units 425 that can be arranged as a match-action pipeline. The extended packet processing pipeline has a pipeline input stage 426 that can receive packet header vectors (PHVs) or directives to perform operations. A PHV can contain data parsed from the header and body of a network packet by the parser 412.

All memory transactions in the NIC 430, including host memory transactions, on board memory transactions, and register reads/writes may be performed via a coherent interconnect 402. In one non-limiting example, the coherent interconnect can be provided by a network on a chip (NOC) "IP core" (in this one context, "IP" is an acronym for intellectual property). Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
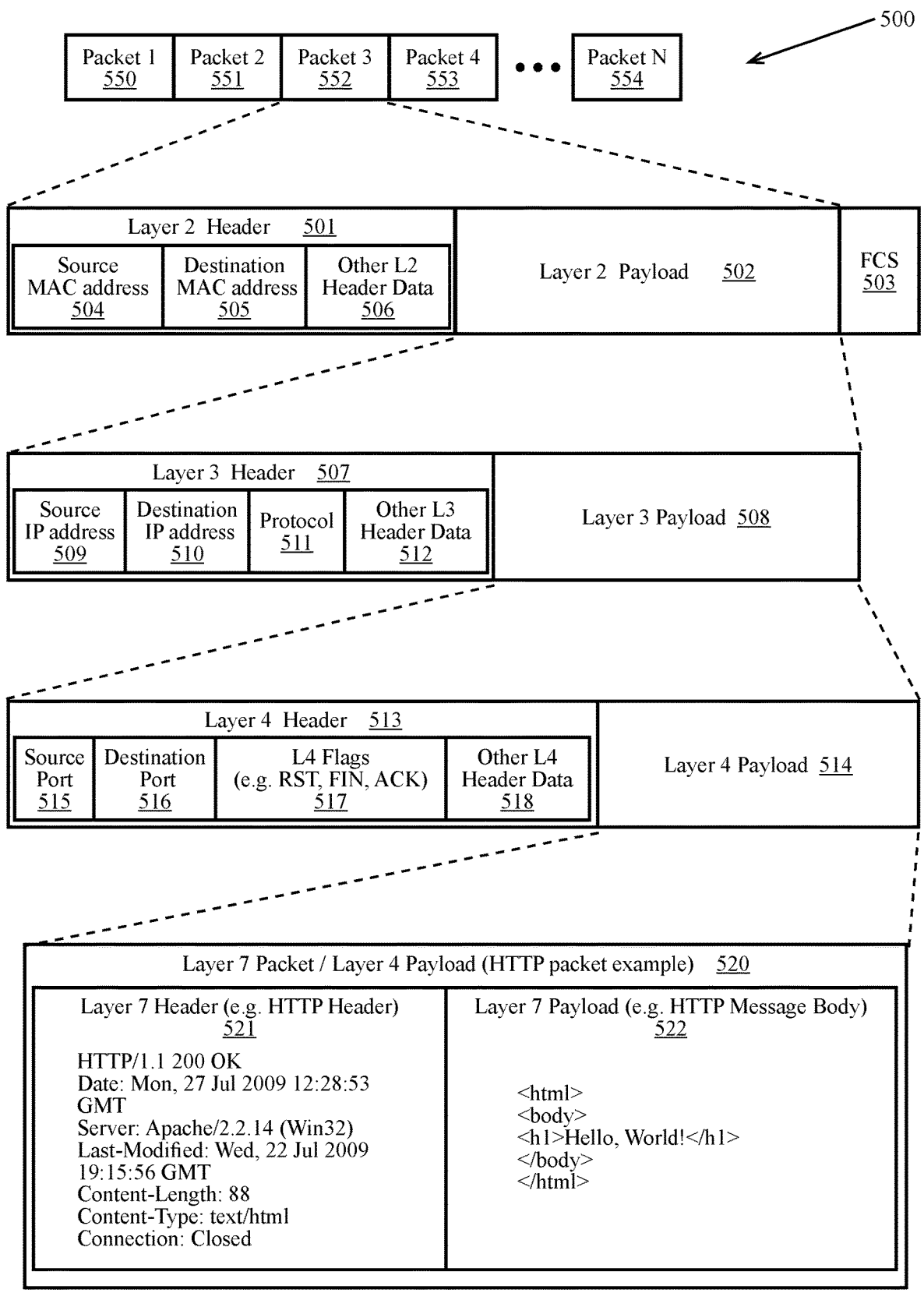
FIG. 5 illustrates packet headers and payloads of packets for network traffic flows including layer 7 fields according to some aspects.

FIG. 5 illustrates packet headers and payloads of packets for network traffic flows 500 including layer 7 fields according to some aspects. A network traffic flow 500 can have numerous network packets such as a first packet 550, a second packet 551, a third packet 552, a fourth packet 553, and a final packet 554 with many more packets between the fourth packet 553 and the final packet 554. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received as a raw bit stream or transmitted as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS) 503. The layer 2 header can contain a source MAC address 504, a destination MAC address 505, and other layer 2 header data 506. The input ports and output ports of a network appliance can have MAC addresses. A network appliance can have a MAC address that is applied to all or some of the ports. Alternatively, a network appliance may have one or more ports that each have their own MAC address. In general, each port can send and receive packets. Ethernet, also known as Institute of Electrical and Electronics Engineers (IEEE) 802.3, is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

The internet layer, often called layer 3, is the network layer where layer 3 packets can be routed from a first node to a second node across multiple intermediate nodes. The nodes can be network appliances such as NICs, switches, routers, etc. Internet protocol (IP) is a commonly used layer 3 protocol. The layer 3 packet can have a layer 3 header 507 and a layer 3 payload 508. The layer 3 header 507 can have a source IP address 509, a destination IP address 510, a protocol indicator 511, and other layer 3 header data 512. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 508 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 507 using protocol indicator 511. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 508 includes a TCP header and a TCP payload. UDP can provide for computer applications to send messages, in this case referred to as datagrams, to other hosts on an IP network using a connectionless model. When carrying UDP data, a layer 3 payload 508 includes a UDP header and a UDP payload. ICMP is used by network devices, including routers, to send error messages and operational information indicating success or failure when communicating with another IP address. ICMP uses a connectionless model.

A layer 4 packet can have a layer 4 header 513 and a layer 4 payload 514. The layer 4 header 513 can include a source port 515, destination port 516, layer 4 flags 517, and other layer 4 header data 518. The source port and the destination port can be integer values used by host computers to deliver packets to application programs configured to listen to and send on those ports. The layer 4 flags 517 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 514 can contain a layer 7 packet.

The application layer, often called layer 7, includes the protocols used by most applications for providing user services or exchanging application data over the network connections established by the lower level protocols. Examples of application layer protocols include RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 514 may include a layer 7 packet 520. A layer 7 packet can have a layer 7 header 521 and a layer 7 payload 522. The illustrated layer 7 packet is an HTTP packet. The layer 7 header 521 is an HTTP header, and the layer 7 payload 522 is an HTTP message body. The HTTP message body is illustrated as a hypertext markup language (HTML) document. HTTP is specified in requests for comment (RFCs) published by the Internet Engineering Task Force (IETF). IETF RFC 7231 specifies HTTP version 1.1. IETF RFC 7540 specifies HTTP version 2. HTTP version 3 is not yet standardized, but a draft standard has been published by the IETF as "draft-ietf-quic-http-29". HTML is a "living" standard that is currently maintained by Web Hypertext Application Technology Working Group (WHATWG). The HTTP header can be parsed by a P4 pipeline because it has a well-known format having well known header fields. Similarly, HTML documents can be parsed, at least in part, by a P4 pipeline to the extent that the HTML document has specific fields, particularly if those specific fields reliably occur at specific locations within the HTML document. Such is often the case when servers consistently respond by providing HTML documents.

Figure 6:
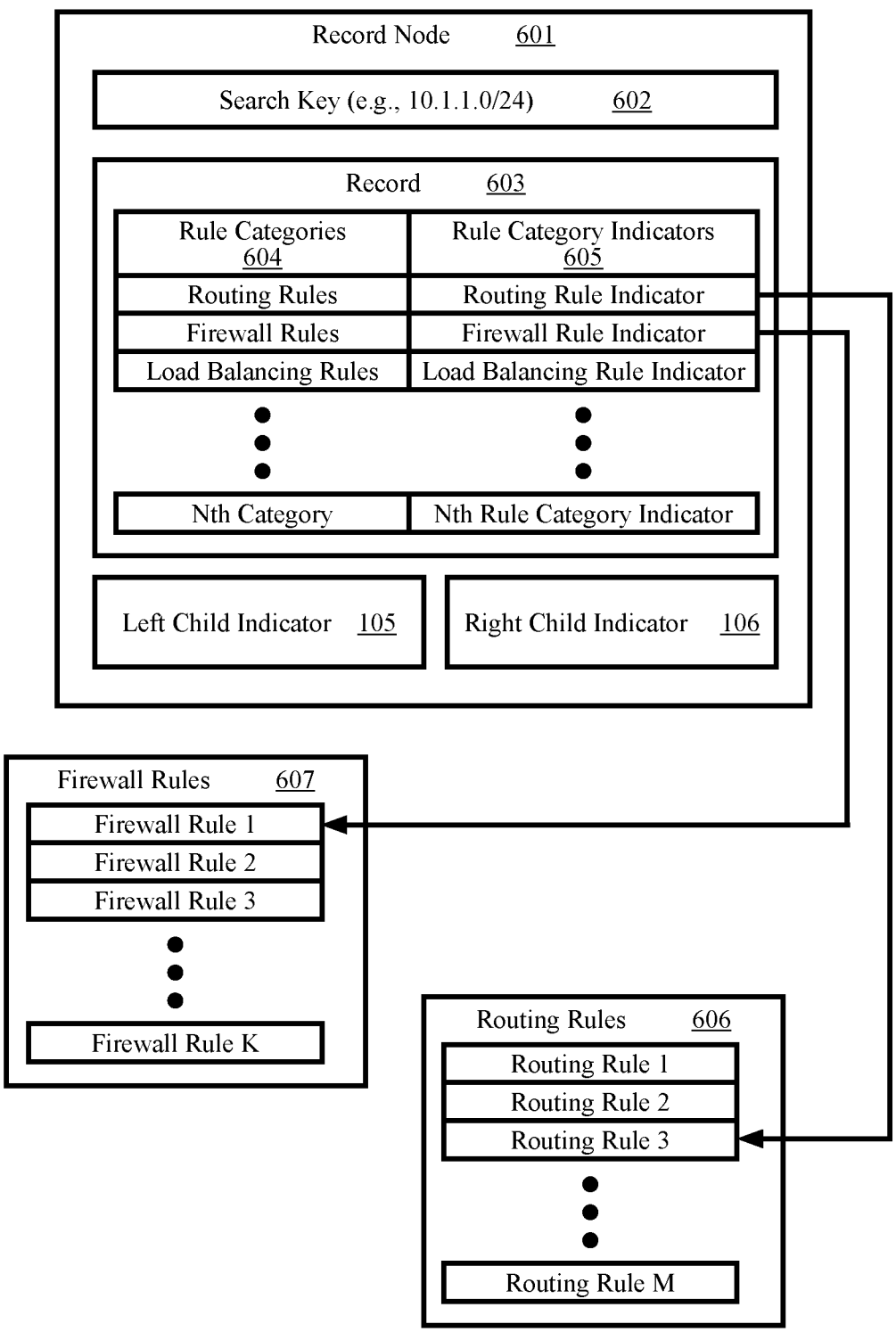
FIG. 6 is a high-level flow diagram illustrating a record node storing data for numerous rule categories according to some aspects.

FIG. 6 is a high-level flow diagram illustrating a record node 601 storing data for numerous rule categories 604 according to some aspects. The record node 601 can be used as the root node of a tree and for the other nodes of the tree. The record node can include a search key 602, a record 603, a left child indicator 105, and a right child indicator 106. The search key can be an interval such as "10.1.1.0/24". Those practiced in computer networking understand that "10.1.1.0/24" is an IP address range that includes IP addresses in the range "10.1.1.0" to "10.1.1.255". As such, the search key can match IP addresses within a range. For example, the search key "10.1.1.0/24" matches "10.1.1.32" but does not match "12.1.1.32". "12.1.1.32" could be matched by a different search key in a different node. The record 603 can contain rule category indicators 605 for data in different rule categories 604. The rule categories 604 can include routing rules, firewall rules, load balancing rules, and other rules. The rules, such as routing rules 606 and firewall rules 607, can be stored in memory 432. The rule indicators can indicate specific rules. For example, the record 603 is illustrated with a routing rule indicator that indicates routing rule 3 and has a firewall rule indicator that indicates firewall rule 1.

Figure 7:
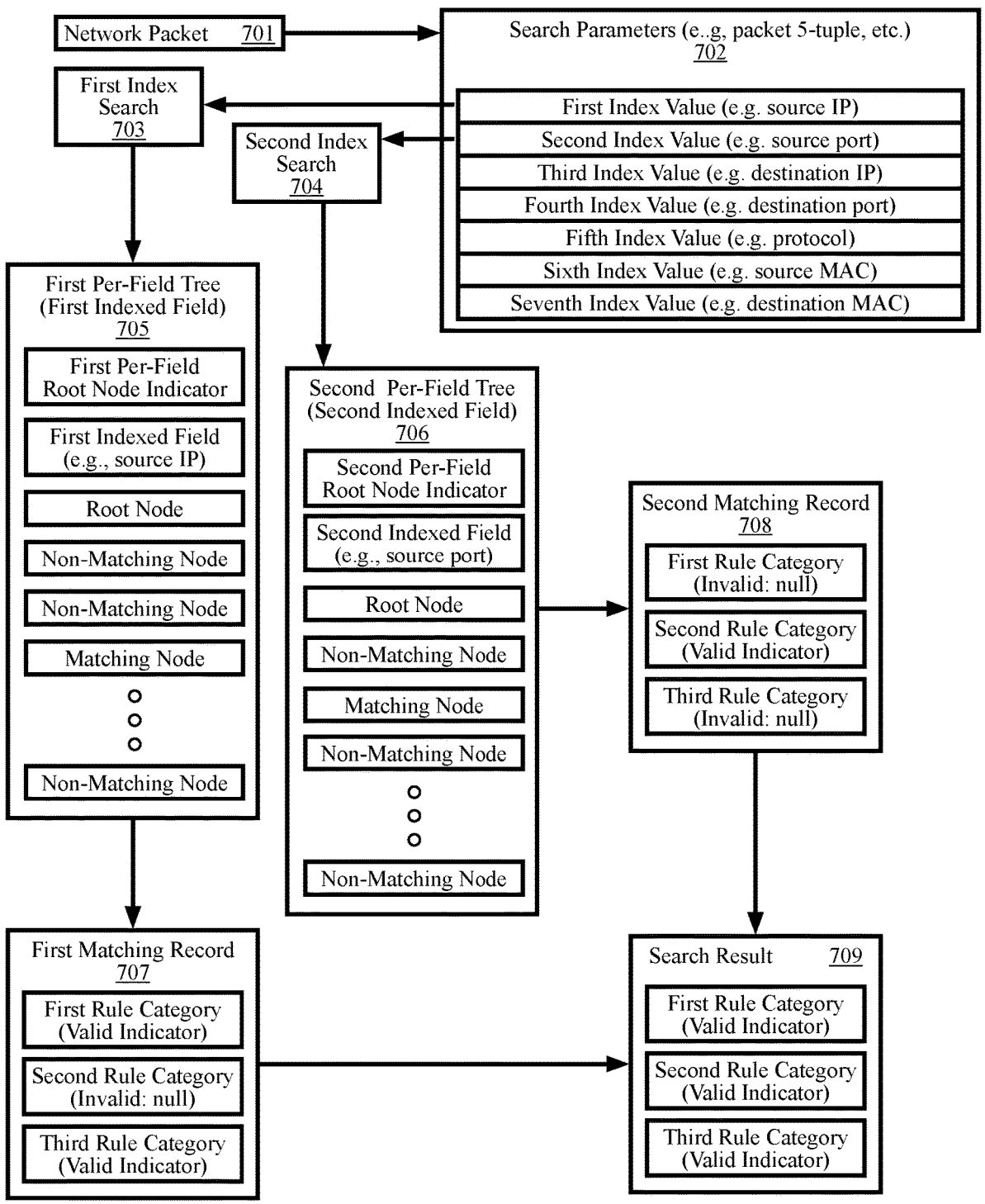
FIG. 7 is a high-level flow diagram illustrating the searching of numerous per-field trees for records related to a network packet according to some aspects.

FIG. 7 is a high-level flow diagram illustrating the searching of numerous per-field trees for records related to a network packet 701 according to some aspects. Search parameters 702 can be read from a network packet 701. The search parameters can include numerous index values such as a first index value, a second index value, a third index value, a fourth index value, a fifth index value, a sixth index value, and a seventh index value. The first index value can be the source IP address read from the network packet. The second index value can be the source port read from the network packet. The third index value can be the destination IP address read from the network packet. The fourth index value can be the destination port read from the network packet. The fifth index value can be the protocol read from the network packet. The sixth index value can be the source MAC address read from the network packet. The seventh index value can be the destination MAC address read from the network packet.

Per-field trees can be indexed using different header fields. For example, a first per-field tree can use a first indexed field (e.g., source IP address) as an index while a second per-field tree can use a second indexed field (e.g., source port) as an index. As such, the first index value can be used for a first index search 703 of the first per-field tree 705. The second index value can be used for a second index search 704 of the second per-field tree 706. The searches can be executed concurrently using different execution threads. The first per-field tree has a first root node indicator that indicates a root node of the first per-field tree. The second per-field tree has a second root node indicator that indicates a root node of the second per-field tree. The first index search 703 finds a first matching record 707 and the second index search 704 finds a second matching record 708. The first matching record 707 can include a valid indicator for a first rule category, an invalid indicator (e.g., a null value can flag an invalid indicator) for a second rule category, and a valid indicator for a third rule category. The second matching record 708 can include an invalid indicator for the first rule category, a valid indicator for the second rule category, and an invalid indicator for the third rule category. The first matching record 707 and the second matching record 708 can be combined to produce a search result 709 that includes valid indicators for all the rule categories. A search result may have invalid indicators for one or more of the rule categories.

The multiple index searches may return multiple valid indicators for a rule category. In such a case, the search result may include multiple valid indicators for the rule category, may include a single preferred indicator from one of the searches, etc. For example, the result of a predetermined one of the index searches may always be the preferred result. In another example, one of the index search results may be preferred for one or some rule categories while another one of the index search results may be preferred for other rule categories.

Per-field trees can be used to more efficiently store the rule indicators than a single tree that is indexed on, for example, the packet 5-tuple which is a combination of source IP, source port, destination IP, destination port, and protocol. The reason is that the per-field trees can be smaller and tree search time scales with tree size. For example, routing rule indicators may be more efficiently stored in a tree using the destination IP address as an index. Load balancing rule indicators may be more efficiently stored in trees using the destination port or the destination IP address as indexes. Firewall rule indicators may be more efficiently stored in trees using the source IP address or the destination port as indexes. The per field tree into which to store data may be selected based on the relative sizes of the trees, the number of new records that would need to be stored, or some other factor.

Figure 8:
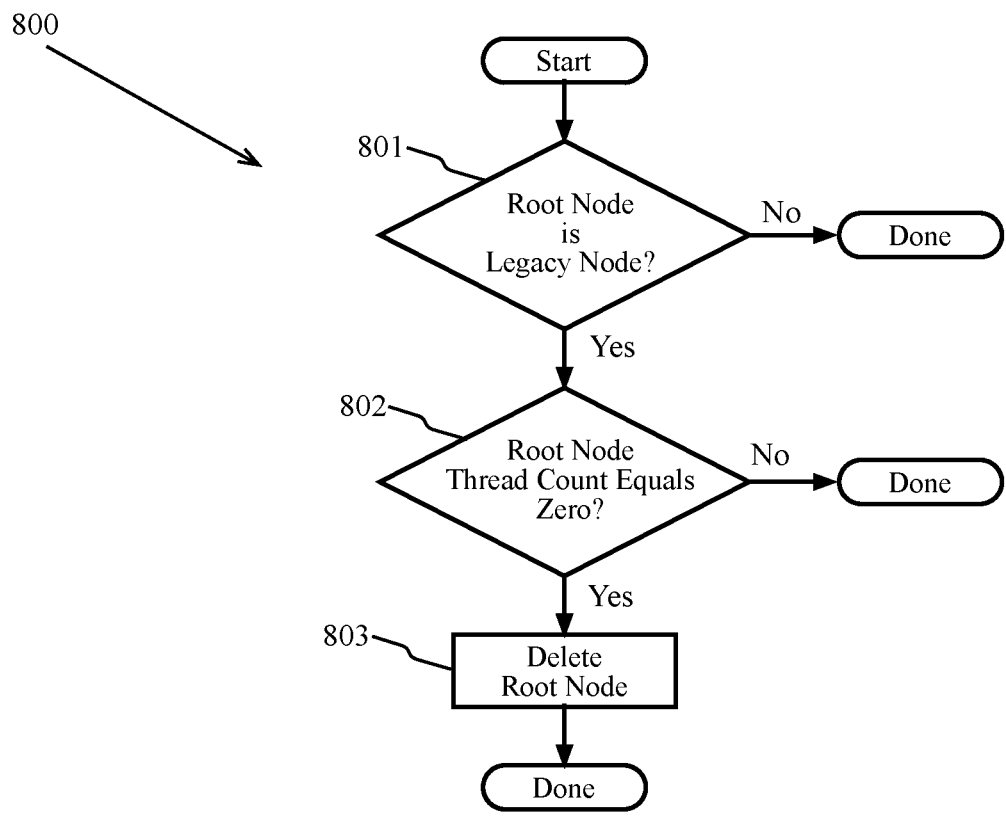
FIG. 8 is a high-level flow diagram illustrating garbage collection of a root node according to some aspects.

FIG. 8 is a high-level flow diagram illustrating garbage collection of a root node 800 according to some aspects. After the start, at decision block 801 the process determines if the root node is a legacy node. A legacy node can be a node that is not referenced by any other node or by a root node indicator. If the node is not a legacy node, the process is done. At decision block 802, the process determines if the node's thread count is zero. Upon accessing a node, a thread can increment the node's thread count. After processing the node and the node's child nodes, the thread can decrement the node's thread count. A thread count of zero indicates that no thread is accessing the node or is accessing the node's children via the node. If the thread count is not zero, the process is done. Otherwise, at block 803 the node can be deleted and the memory used to store the node can be used for another purpose.

Figure 9:
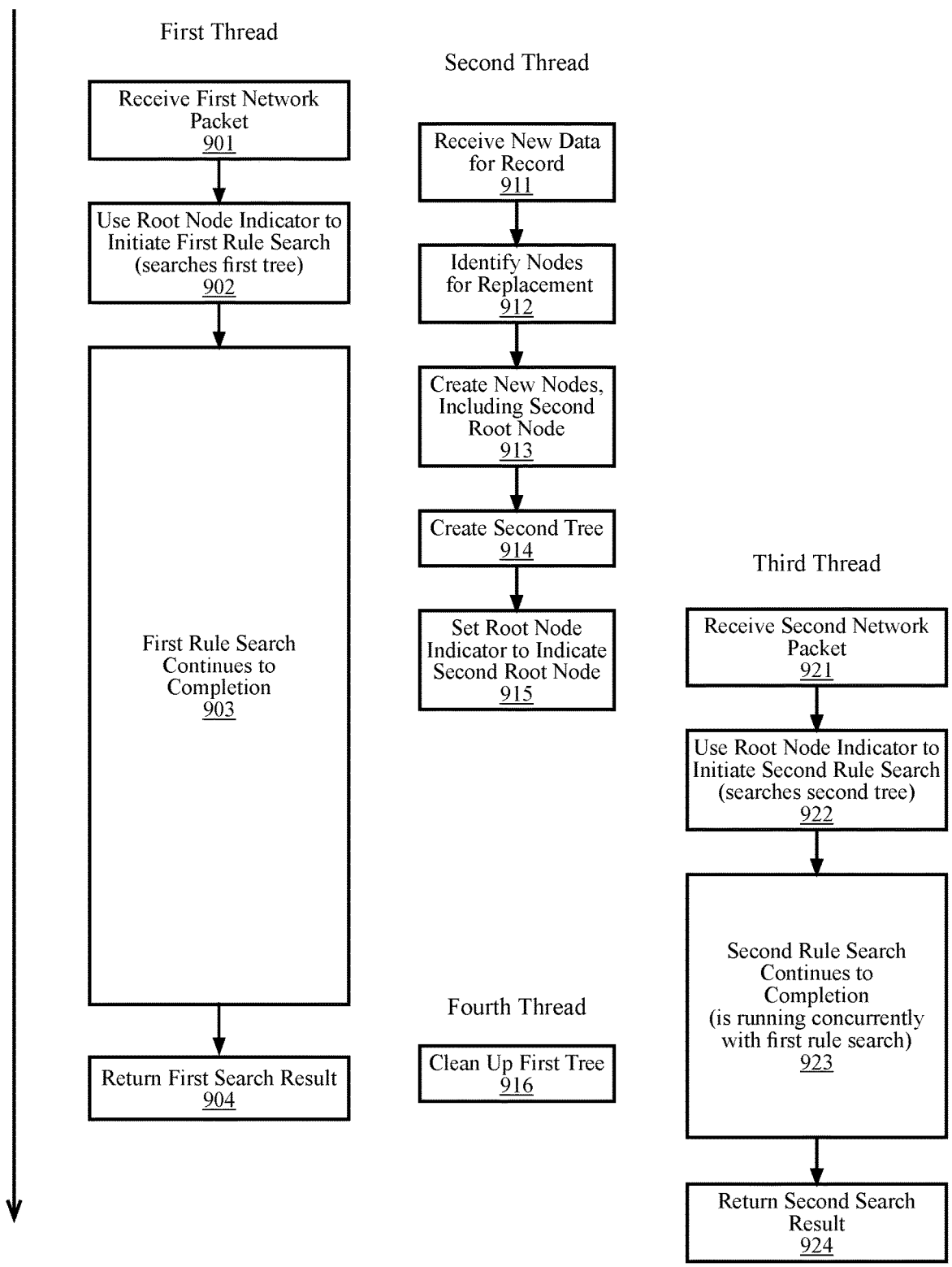
FIG. 9 is a high-level timing diagram illustrating modifying a record without locking a tree data structure according to some aspects.

FIG. 9 is a high-level timing diagram illustrating modifying a record without locking a tree data structure according to some aspects. A first tree data structure is storing a first version of a database. For example, the record node 601 illustrated in FIG. 6 can be a record node for a database of rule category indicators. Four threads are shown. The first thread begins searching for an entry in the database. The second thread modifies the database while the first thread is searching. The third thread begins searching the modified database while the first thread is still searching. Database consistency is ensured because the first thread uses the first tree to search the first version of the database while the third thread uses the second tree to search the new version of the database. The fourth thread can be a garbage collector.

At block 901, a first network packet is received and the first thread is launched. At block 902 a first rule search is initiated using the root node indicator. A rule search can be a search that locates a record that contains or indicates one or more rules. For example, a rule search can be a search of a tree having nodes such as record node 601 of FIG. 6. At this point, the root node indicator indicates the root node of the first tree. At block 903, the first rule search continues to completion. At block 904, the result of the first rule search is returned.

At block 911, the second thread receives new data for the database. At block 912, nodes for replacement are identified. As discussed above, the nodes for replacement include the root node, the node(s) into which the new data is stored, and any intermediate nodes. At block 913, new nodes are created that will replace the nodes for replacement. At block 914, the second tree is created. At block 915, the root node indicator is set to indicate the root node of the second tree, at which point the second thread may exit. Note that the second thread did not modify any of the first tree nodes, but instead created a second tree that includes many of the nodes that are also in the first tree.

At block 921, a second network packet is received and the third thread is launched. At block 922 a second rule search is initiated using the root node indicator. At this point, the root node indicator indicates the root node of the second tree. At block 923, the second rule search continues to completion. At block 924, the result of the second rule search is returned. Here, the second rule search searches the second tree at the same time as the first rule search searches the first tree. In fact, both the first thread and the third thread may concurrently access a node that is in both the first tree and in the second tree. It is a property of the recursive search algorithms that both searches proceed normally within their respective trees.

The fourth thread may run after the second node is complete. At block 916, the fourth node cleans up the first tree by deleting the unreferenced and unused nodes of the first tree, which in effect deletes the first tree while keeping the second tree.

Figure 10:
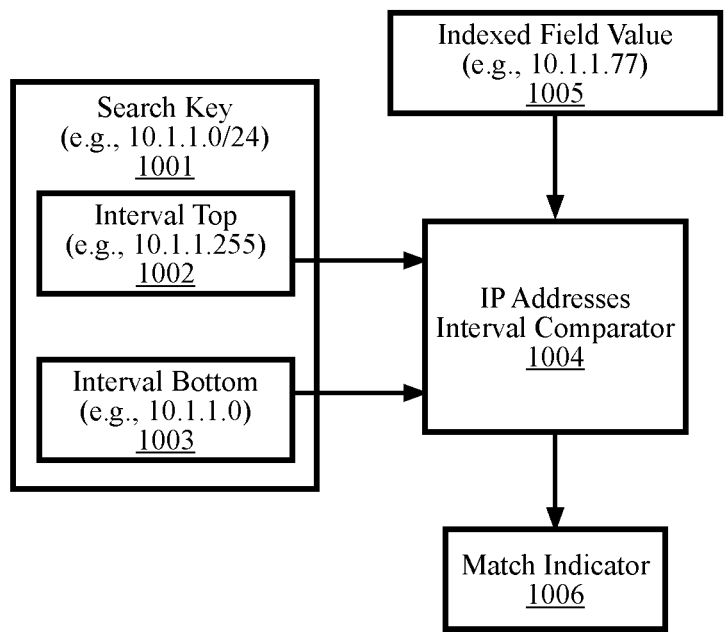
FIG. 10 is a high-level flow diagram illustrating using an interval search key according to some aspects.

FIG. 10 is a high-level flow diagram illustrating using an interval search key 1001 according to some aspects. For example, the interval search key 1001 can be for the interval "10.1.1.0/24". Those practiced in computer networking understand that "10.1.1.0/24" indicates a range of IP addresses that ranges from "10.1.1.0" to "10.1.1.255", inclusive. As such, the interval top 1002 for the search key 1001 would be "10.1.1.255" and the interval bottom 1003 would be "10.1.1.0". The search key 1001 matches any IP address within the interval. An IP address interval comparator 1004 can determine if an indexed field value 1005 is in the interval. If the indexed field value is in the interval, the match indicator 1006 indicates that the indexed field value 1005 matches the search key 1001.

Figure 11:
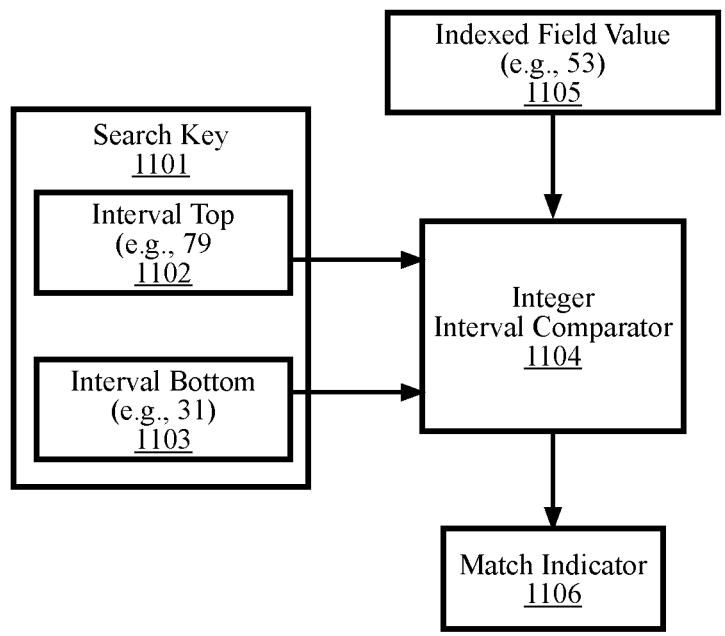
FIG. 11 is a high-level diagram illustrating using an integer interval search key according to some aspects.

FIG. 11 is a high-level diagram illustrating using an integer interval search key 1101 according to some aspects. For example, the interval search key 1101 can be for the interval 31-79. As such, the interval top 1102 for the search key 1101 would be 79 and the interval bottom 1103 would be 31. The search key 1101 matches any number within the interval. An integer interval comparator 1104 can determine if an indexed field value 1105 is in the interval. If the indexed field value is in the interval, the match indicator 1106 indicates that the indexed field value 1105 matches the search key 1101.

Figure 12:
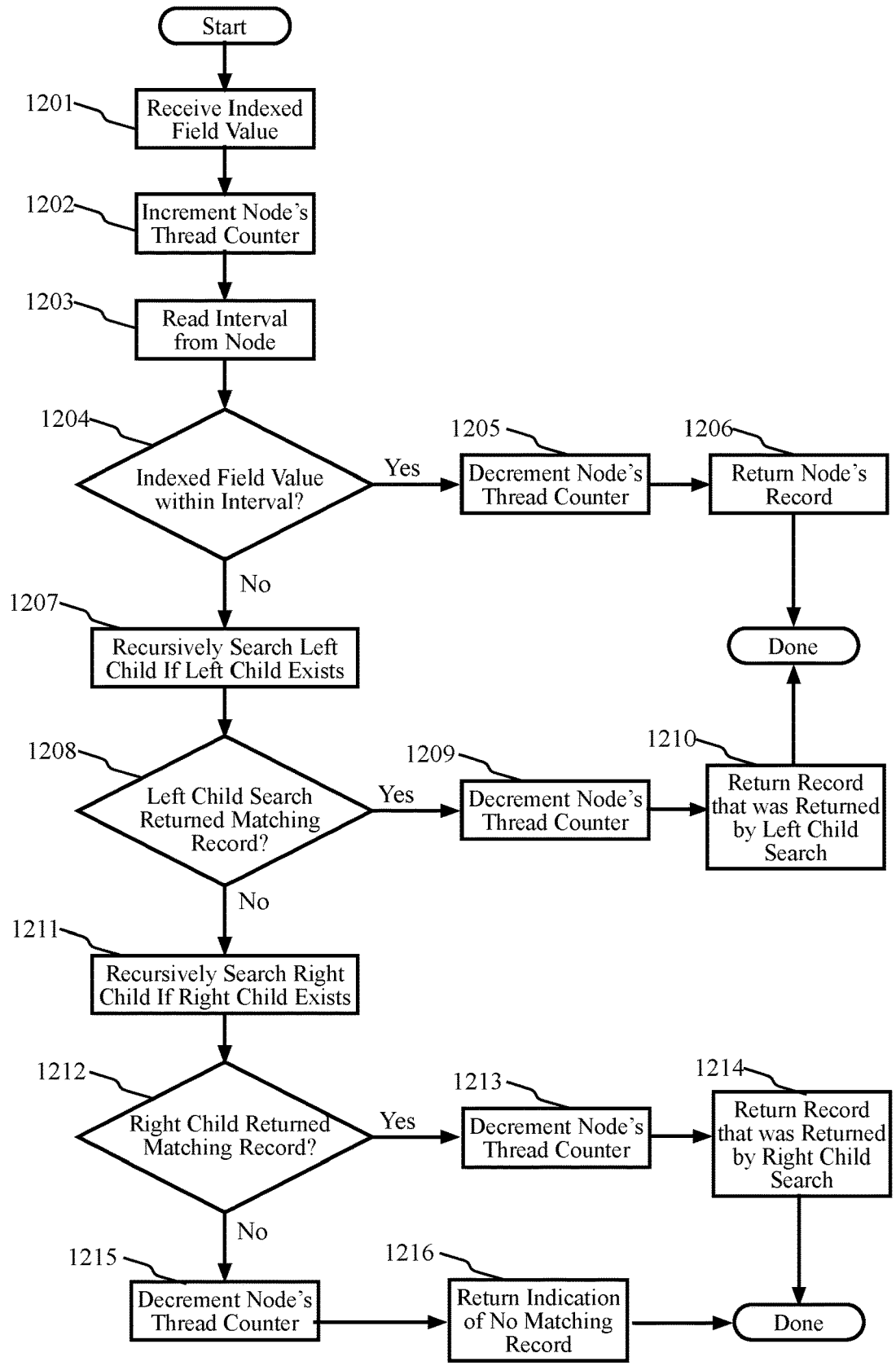
FIG. 12 is a high-level flow diagram illustrating use of a pure interval search according to some aspects.

FIG. 12 is a high-level flow diagram illustrating use of a pure interval search according to some aspects. The process illustrated in FIG. 12 is a recursive search routine that searches a node and the node's child nodes. After the start, at block 1201 the indexed field value is received. The indexed field value can be a number, an IP address, a string, etc. At block 1202, the node's thread counter can be incremented. A node may be deleted if the node has a thread count of zero and is not referenced by any other node or a root node indicator.

At block 1203, the interval (e.g., search key 1001 of FIG. 10 or search key 1101 of FIG. 11) can be read from the node. At decision block 1204, the process determines if the indexed field value is within the interval. For example, the match indicator blocks 1006, 1106 of FIGS. 10-11 can indicate whether or not the indexed field value is within the interval. If the indexed field value is within the interval, then at block 1205 the node's thread counter is decremented. At block 1206, the node's record is returned and the process is done. If the indexed field value is not within the interval, then at block 1207, the node's left child node is recursively searched if that left child node exists. A child node can be recursively searched via a recursive search routine such as that of FIG. 12. At decision block 1208, the process can determine if the left child search returned a matching record. If the left child search returned a matching record, then at block 1209 the node's thread counter is decremented. At block 1210, the record that was returned by the left child search is returned and the process is done.

If the left child search did not return a matching record, then at block 1211, the node's right child node is recursively searched if that right child node exists. At decision block 1212, the process can determine if the right child search returned a matching record. If the right child search returned a matching record, then at block 1213 the node's thread counter is decremented. At block 1214, the record that was returned by the right child search is returned and the process is done. If the right child search did not return a matching record, then at block 1215, the node's thread counter is decremented. At block 1216, an indication of no matching record is returned before the process is done.

Figure 13:
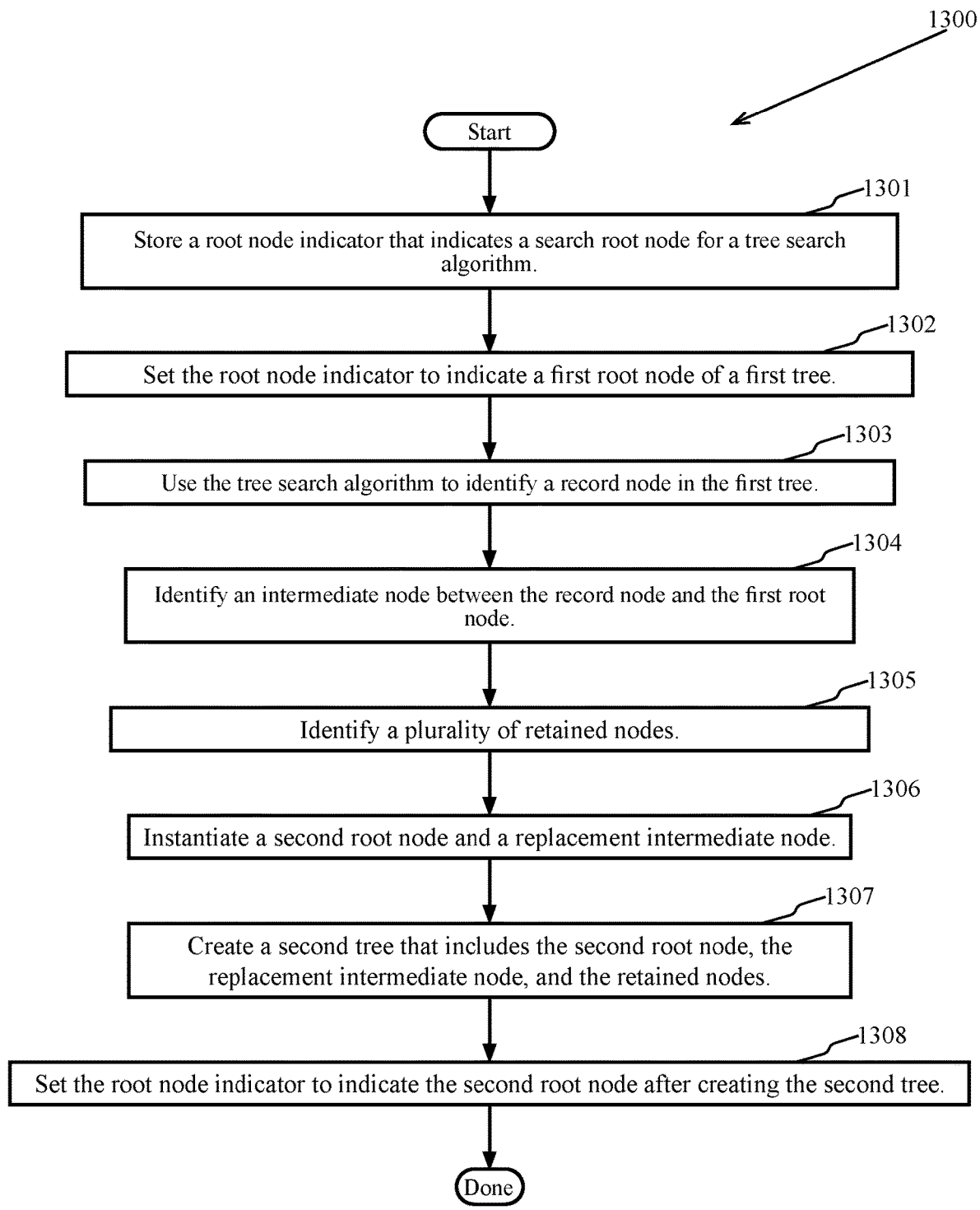
FIG. 13 is a high-level flow diagram illustrating a method for data consistent search and storage using trees according to some aspects.

FIG. 13 is a high-level flow diagram illustrating a method for data consistent search and storage using trees 1300 according to some aspects. At block 1301, the process can store a root node indicator that indicates a root node for a tree search algorithm. At block 1302, the process can set the root node indicator to indicate a first root node of a first tree. At block 1303, the process can use the tree search algorithm to identify a record node in the first tree. At block 1304, the process can identify an intermediate node between the record node and the first root node. At block 1305, the process can identify a plurality of retained nodes. At block 1306, the process can instantiate a second root node and a replacement intermediate node. At block 1307, the process can create a second tree that includes the second root node, the replacement intermediate node, and the retained nodes. At block 1308, the process can set the root node indicator to indicate the second root node after creating the second tree.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniB and interfaces) and/or PCI Express (PCIe) interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
storing a first version of a plurality of records in a plurality of nodes of a first tree, the records indicating a plurality of rules that include a routing rule, a firewall rule, or a load balancing rule;
performing, in response to receiving a network packet, a first search of the first tree to identify one of the nodes that matches the network packet to thereby identify one of the rules;
creating a second tree that stores a second version of the records,
wherein:
creating the second tree includes creating a second tree root node of the second tree, creating a record node that stores a new record in the second tree, and creating an intermediate node that is in the second tree between the second tree root node and the record node;
the second tree includes a plurality of retained nodes that are in the first tree; and
creating the second tree begins after the first search begins and before the first search completes.

2. The method of claim 1 further including:
performing a second search of the second tree to identify a second one of the records,
wherein the second search begins before the first search completes.

3. The method of claim 1, further including deleting a first tree root node in response to determining that a thread count indicates there are no active searches rooted at the first tree root node.

4. The method of claim 1, wherein:
the record node associates an indexed field interval with a record;
a second record node associates the indexed field interval with a second record;
the first tree includes the second record node; and
the second tree does not include the second record node.

5. The method of claim 1, wherein:
the record node associates an indexed field interval with a record that includes a plurality of network rule category indicators;
one of the network rule category indicators indicates a valid result for a first network rule category; and
another one of the network rule category indicators indicates that there is no valid result for a second network rule category.

6. The method of claim 5 wherein the first network rule category includes routing rules.

7. The method of claim 6, further including:
performing a second search of the second tree to identify a second one of the records,
wherein:
the first search uses a root node indicator to identify a first tree root node
the second search is performed in response to receiving a second network packet and uses the root node indicator to identify the second tree root node; and
the second search begins after the first search begins and before the first search completes.

8. The method of claim 1 wherein the first tree and the second tree are interval trees.

9. The method of claim 1 wherein the first search uses a tree search algorithm that is a pure interval search algorithm.

10. The method of claim 1 wherein:
the first search includes a first index search and a second index search;
a root node indicator is associated with a first indexed field;
a second per-field root node indicator is associated with a second indexed field and indicates a second per-field root node of a second per-field tree;
the first index search uses the root node indicator and yields no valid result for a first rule category;
the second index search uses the second per-field root node indicator to search the second per-field tree and yields a valid result for the first rule category; and
the first search returns the valid result.

11. The method of claim 10 wherein:
the first index search yields a second valid result for a second rule category;
the second index search yields no valid result for the second rule category; and
the first search returns the second valid result.

12. A network appliance comprising:
a memory configured to store a first version of a plurality of records in a plurality of nodes of a first tree, the records indicating a plurality of rules that include a routing rule, a firewall rule, or a load balancing rule;
at least one processor that is operatively coupled to the memory and is configured to:
perform, in response to the network appliance receiving a network packet, a first search of the first tree to identify one of the nodes that matches the network packet to thereby identify one of the rules; and
create a second tree that stores a second version of the records,
wherein:
creating the second tree begins after the first search begins and before the first search completes;
creating the second tree includes creating a second tree root node of the second tree, creating a record node that stores a new record in the second tree, and creating an intermediate node that is in the second tree between the second tree root node and the record node; and
the second tree includes a plurality of retained nodes that are in the first tree and in the second tree.

13. The network appliance of claim 12, wherein:
the network appliance performs a second search of the second tree in response to receiving a second network packet; and
the second search begins after the first search begins and before the first search completes.

14. The network appliance of claim 13, wherein:
the second search determines that the record node matches the second network packet;
the record node associates an indexed field interval with a record that includes a plurality of rule category indicators;
one of the rule category indicators indicates a valid result that is for a first rule category; and
another one of the rule category indicators indicates no valid result for a second rule category.

15. The network appliance of claim 14 wherein the first rule category includes firewall rules.

16. The network appliance of claim 12 wherein the first search uses a tree search algorithm that is a pure interval search algorithm.

17. The network appliance of claim 14 wherein:
the first search includes a first index search and a second index search;
a root node indicator is associated with a first indexed field;
a second per-field root node indicator is associated with a second indexed field;
the first index search uses the root node indicator to search the first tree;
the second index search uses the second per-field root node indicator to search a second per-field tree;
the first index search yields no valid result for the second rule category;
the second index search yields a second valid result that is for the second rule category; and
the first search returns the valid result and the second valid result.

18. The network appliance of claim 17 wherein:
the second index search yields a third valid result that is for the first rule category; and
the first search does not return the third valid result.

19. A system comprising:
a first tree means for storing a first version of a plurality of records, the records indicating a plurality of rules that include a routing rule, a firewall rule, or a load balancing rule;
a search means for searching, in response to receiving a network packet, the first tree means for a node matching the network packet to thereby identify one of the rules;
a means for receiving a new data for storage in the records;
a means for using the new data to identify a plurality of altered tree nodes and retained tree nodes of the first tree means; and
a means for producing a second tree means for storing a second version of the records, the second tree means produced from the first tree means by replacing the altered tree nodes and retaining the retained tree nodes,
wherein producing the second tree means begins after searching the first tree means and before searching the first tree means completes.

20. The system of claim 19, wherein the search means is configured to:
search the second tree means to thereby identify a second one of the rules, and
search the second tree means while searching the first tree means.

* * * * *